(12) United States Patent
Kane et al.

(10) Patent No.: US 7,791,786 B2
(45) Date of Patent: Sep. 7, 2010

(54) AFOCAL BEAM STEERING SYSTEM CORRECTED FOR EXCESS DIFFRACTION DUE TO PHASE ERROR FROM MICROELECTROMECHENICAL MIRROR OFFSETS

(75) Inventors: David M. Kane, Tucson, AZ (US); Randall E. Potter, Northridge, CA (US)

(73) Assignee: Arete' Associates, Northridge, CA (US)

( * ) Notice: Subject to any disclaimer, the term of this patent is extended or adjusted under 35 U.S.C. 154(b) by 479 days.

(21) Appl. No.: 11/705,809

(22) Filed: Feb. 12, 2007

(65) Prior Publication Data
US 2007/0183013 A1    Aug. 9, 2007

(51) Int. Cl.
G02F 1/01      (2006.01)
G02F 1/00      (2006.01)
G02B 26/00    (2006.01)

(52) U.S. Cl. .................. 359/279; 359/237; 359/290; 385/18

(58) Field of Classification Search .......... 359/237, 359/238, 279, 290–292, 298, 566; 398/147, 398/158, 188; 372/29.016, 29.023; 355/67, 355/71; 430/322; 385/1, 11, 14–18, 37
See application file for complete search history.

(56) References Cited

U.S. PATENT DOCUMENTS

| | | | | |
|---|---|---|---|---|
| 3,485,552 A | * | 12/1969 | Adler | .................. 359/315 |
| 5,896,228 A | * | 4/1999 | Inoue et al. | .................. 359/555 |
| 6,539,142 B2 | * | 3/2003 | Lemoff et al. | .................. 385/18 |
| 6,549,691 B1 | * | 4/2003 | Street et al. | .................. 385/18 |
| 6,549,692 B1 | * | 4/2003 | Harel et al. | .................. 385/18 |
| 6,560,384 B1 | * | 5/2003 | Helkey et al. | .................. 385/18 |
| 7,189,498 B2 | * | 3/2007 | Eib et al. | .................. 430/322 |
| 7,346,085 B1 | * | 3/2008 | Rothenberg et al. | .... 372/29.016 |
| 7,400,382 B2 | * | 7/2008 | Baba-Ali et al. | .............. 355/67 |

* cited by examiner

*Primary Examiner*—Loha Ben
(74) *Attorney, Agent, or Firm*—Peter I. Lippman

(57) ABSTRACT

An afocal beam system corrects excess diffraction from phase error in microelectromechanical mirror offsets. One invention aspect interposes an opposing phase difference, between rays reflected at adjacent mirrors, varying the difference with mirror angle to make it roughly an integral number of waves. Mirror-array (not one-mirror) dimensions limit diffraction. Another aspect sharpens by generating and postprocessing signals to counteract phase difference. A third has, in the optical path, a nonlinear phase-shift device introducing a phase shift, optically convolves that shift with others from mirrors, then deconvolves to extract unshifted signals. A fourth varies mirror position in piston as a function of mirror angle to hold phase difference to an integral number of waves. A fifth aspect has, in the path, at least one delay element—whose delay varies as a function of mirror angle. A sixth has another mirror array in series with the first, matching their angles to introduce opposing phase difference.

5 Claims, 8 Drawing Sheets

$2\Delta = 2D\sin(\Theta) + d(n_1 - n_2) = M \times \lambda$
(Vary n for each individual mirror as a function of Θ)

$2\Delta = 2D\sin(\Theta) + n(d_1 - d_2) = M \times \lambda$
(Vary d for each individual mirror as a function of Θ)

AFOCAL BEAM STEERING SYSTEM CORRECTED FOR EXCESS DIFFRACTION DUE TO PHASE ERROR FROM MICROELECTROMECHENICAL MIRROR OFFSETS

RELATION BACK

We claim priority of PCT application PCT/US2005/028777 and its precursor, Provisional Application 60/601,015 filed Aug. 11, 2004.

FIELD OF THE INVENTION

This invention relates to systems and procedures in which a microelectromechanical system (MEMS) mirror array is used to steer substantially coherent imaging or projection beams. As is well known, mirrors in a MEMS array are small elements, closely juxtaposed and independently manipulated—usually under microprocessor control.

Many different configurations and applications of such beam-steering systems are possible, particularly including but not limited to lidar and other laser-beam implementations. It will be understood, however, that some radiation to which this invention is applicable may be substantially coherent by reason, at least in part, of having originated at a very great distance from an optical system of interest. Some such variants have been introduced in two international applications PCT/US03/39535 and PCT/US03/16062 (each in the name of David Kane as applicant for the United States, and Areté Associates for all other jurisdictions), which are hereby wholly incorporated by reference in this present document.

A key characteristic of most such systems and procedures is how fine the angular resolution can be. Ideally, design is carefully performed so that resolution is limited by diffraction only.

As will be explained below, however, in the case of systems incorporating a MEMS array even this theoretical limit is itself subject to degradation by fundamental physical properties of the array. The present invention relates to minimizing that degradation.

BACKGROUND

Some preferred embodiments of the present invention address the diffraction-limited resolution in a remote-sensor optical system with an optical axis 11 (FIG. 1), and with a collimated beam 12 passing through an afocal lens 13 (having a magnification ratio of Z to 1) to form a magnified or minified beam 14 that reaches a MEMS scan-mirror array 15. The array in turn produces from that beam 14 a deflected beam 16 which next reaches a reimaging lens 17.

This lens in turn forms from the deflected beam a focused beam 18, at an image plane 19 spaced from the reimager by that element's focal length f. When the input beam 12 is on-axis as shown, the MEMS mirrors in the array 15 are necessarily set to be nominally planar, as a group—that is, all substantially aligned with a common base plane 38 of the array (or a common plane 38 of the mirror pivots).

In this on-axis, planar condition all the light 12, 14 that is coherent initially—before reflection by the MEMS scan-mirror array—is again coherent at each position 16 and 18, as well as the image plane 19, after the reflection. In other words, light that is all in phase initially is also all in phase later.

Furthermore with the MEMS mirrors in this condition they behave, for purposes of diffraction analysis, very much as if they were a single mirror having the overall size of the array.

Accordingly the resulting diffraction-limited spot size φ, at the image plane 19 after passage of the beam 16, 18 through the reimaging lens 17, is inversely proportional to the size of that effective "single" mirror, which is to say the size of the array.

If there are N mirrors, each of size D, along one dimension of the array, then the size of the effective single mirror is the product ND, and the smallest spot size φ is inversely proportional to ND:

$$\phi = \frac{2.44\lambda}{ND}.$$

In this case, e. g. for an array of just two mirrors each having dimension D, that size is 2D.

$$\phi = \frac{2.44\lambda}{2D} = 1..22\lambda/D.$$

Thus for this on-axis, planar case, the diffraction-controlling dimension ND is twice the linear dimension D of each individual mirror. Thus the diffraction limit is twice as fine as (i. e. is half the size of) the spot size which corresponds to that dimension D of each individual mirror.

This condition may be regarded as characterizing sensed beams that are addressing field sources which are on axis (e. g., normal) with respect to the MEMS mirror array—or more generally whenever the individual mirror surfaces as a group are aligned with their common base plane. It will shortly be seen that a like condition applies to projected beams that are addressing field transmission targets, provided only that the beam outside the system is on axis and the array in its aligned, groupwise-planar condition.

What is of particular interest, however, is what happens to the diffraction limit if the external beam is off axis, and the MEMS array accordingly rotated out of its planar condition. This occurs as soon as the afocal MEMS beam steering system is dynamically modified—by rotation of the MEMS array 15—as this action does indeed correspond to operation with both the excitation beam 112 (FIG. 2) and the resulting magnified or minified beam 114 off-axis.

Under these conditions the light waves no longer in effect encounter (or "see") the equivalent of a single mirror of linear dimension ND but instead encounter plural single mirrors whose extent is not combined. Diffraction then proceeds in accordance with the dimension D of only one individual MEMS mirror, so that the two subbeams 116 from adjacent mirrors have a phase difference 2Δ and the reimaged beam 118 has an enlarged (coarser) minimum spot size 119.

Thus the above-explained advantageous finer diffraction limit is unfortunately lost, and the applicable value is instead:

$$\phi = \frac{2.44\lambda}{1D} = \frac{2.44\lambda}{D} = 2.44\lambda/D.$$

Analogously of interest, as already mentioned above, is the resolution of a coherent-beam (most typically laser) projection system (FIG. 3), in which a collimated projection beam 21 is deflected by a MEMS scan-mirror array 22 to direct plural individual beams 23 toward an afocal lens 24 (again with Z-to-1 magnification). Here the deflected beams 23 are on-axis (i. e., parallel to the optical axis 26)—and thereby producing, at the lens 24, an on-axis projected beam 25.

Here it is the beam divergence α that is controlled by the overall dimension of the mirror array 22, provided that the mirrors are in fact groupwise planar to yield an on-axis beam 25. In this favorable condition, the divergence is controlled by the product ND as before:

$$\alpha = \frac{2.44\lambda}{ND} = \frac{2.44\lambda}{2D} = 1.22\lambda/D.$$

and for the simple exemplary case of two mirrors this reduces as before to—

$$\alpha = \frac{2.44\lambda}{1D} = \frac{2.44\lambda}{D} = 2.44\lambda/D.$$

Again, however, the particular phenomenon of interest is the coarser diffraction limit corresponding to the dimension D of one individual MEMS mirror, when the system is modified (simply by rotation of the MEMS array) to operate with a phase difference 2Δ between the two deflected subbeams 123 (FIG. 4) entering the afocal lens 24, and with the projected beam 125 off-axis:

$$\alpha = \frac{2.44\lambda}{ND}.$$

Thus, summarizing, when the AMBS system either images or projects to a different field location (FIGS. 2 and 4), unfortunately there arises in the wavefront a phase difference of 2Δ, where Δ=D sin θ—in which θ is the MEMS scan angle. This delay is proportional (for small θ) to the MEMS scan angle. Now the diffraction-limited spot size or divergence is set by the size of an individual MEMS mirror D, rather than the size of the entire N-mirror array and the corresponding product ND as before.

In a practical case the number N of individual mirrors is typically at least ten and sometimes on the order of a hundred. Consequently the adverse implications of this effect are very severe.

The described diffraction-limit-degrading effect is significant only if phase mismatch between adjacent mirrors departs from an integral number of wavelengths by roughly a tenth of one wavelength or more. In other words, if the total phase difference exceeds about 10% of a wave, diffraction in a sensor system is controlled by the individual mirror dimension. When the phase difference increases beyond about 90% of a wave, however, then once again the diffraction is controlled by the overall array dimension—until again the difference exceeds 110% of a wave.

As to the exact size of the diffraction-limited spot, the introductory discussion here is not rigorous but may be regarded as a first-order approximation. In particular the mirror scan angle θ causes the diffraction limit to be either λ/D or λ/ND multiplied by some theoretical form-factor; and what is of interest is the basic phenomenon—particularly the dominant effect of N—rather than that form-factor.

Analogously, a projection system illustrated in FIG. 3—projecting parallel to the system axis—has a beam divergence α, inversely proportional to the MEMS array size. When projecting to another field location, the identical optical system suffers a phase difference 2Δ, between adjacent MEMS rows, proportional to the MEMS scan angle θ—and the beam divergence is then inversely proportional to the individual MEMS mirror size D (FIG. 4).

In the case of such a projection system, if the phase difference can be maintained such that it is an integral number of wavelengths λ, then the system when operating at a single wavelength λ or over a narrow band about that wavelength can obtain imaging performance determined by the dimension of the entire scan-mirror array, not the individual mirrors. This provides a significant improvement over what would be possible in terms of the beam divergence of a projection system—in the cases being considered, again, factors of ten to one hundred.

To recapitulate, a potential shortfall in sharpness—with a MEMS scan-mirror array—develops from the phase error introduced by the arrangement of the mirrors. This phase error very undesirably forces the diffraction limit to scale with the area of each individual mirror, rather than the total area of the mirrors in the array.

As can be now understood, the prior art—although providing powerful and very sophisticated imaging and sensing capabilities—has left some refinements to be desired in the area of ideally fine-focused images and optical projection.

SUMMARY OF THE INVENTION

Aspects of the invention operate by holding the phase difference at substantially an integral number of wavelengths λ, at least within the tenth-of-a-wavelength threshold mentioned earlier. If this condition is met, then the system when operating at a single wavelength λ or over a narrow band about that wavelength can achieve imaging performance determined by the dimension of the entire scan mirror array, rather than only the individual mirrors.

This result provides a significant improvement in terms of the imaging resolution of a sensor system—in the cases being considered, factors of ten to one hundred. Four methods of controlling the phase of the wavefront from a MEMS scan-mirror array in an AMBS sensor system, including three methods also applicable to a projection system, are taught in the Detailed Description section of this document, with reference to the accompanying drawings—of which:

Figure 2:
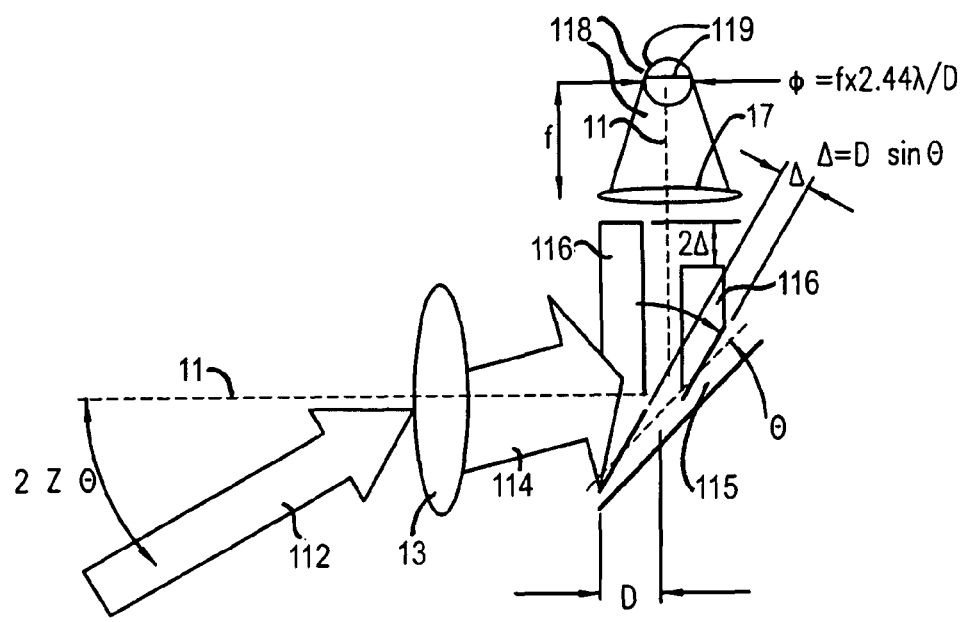
FIG. 2 is a like diagram of the FIG. 1 AMBS system but introducing phase error due to imaging of an off-axis field location.
Figure 4:
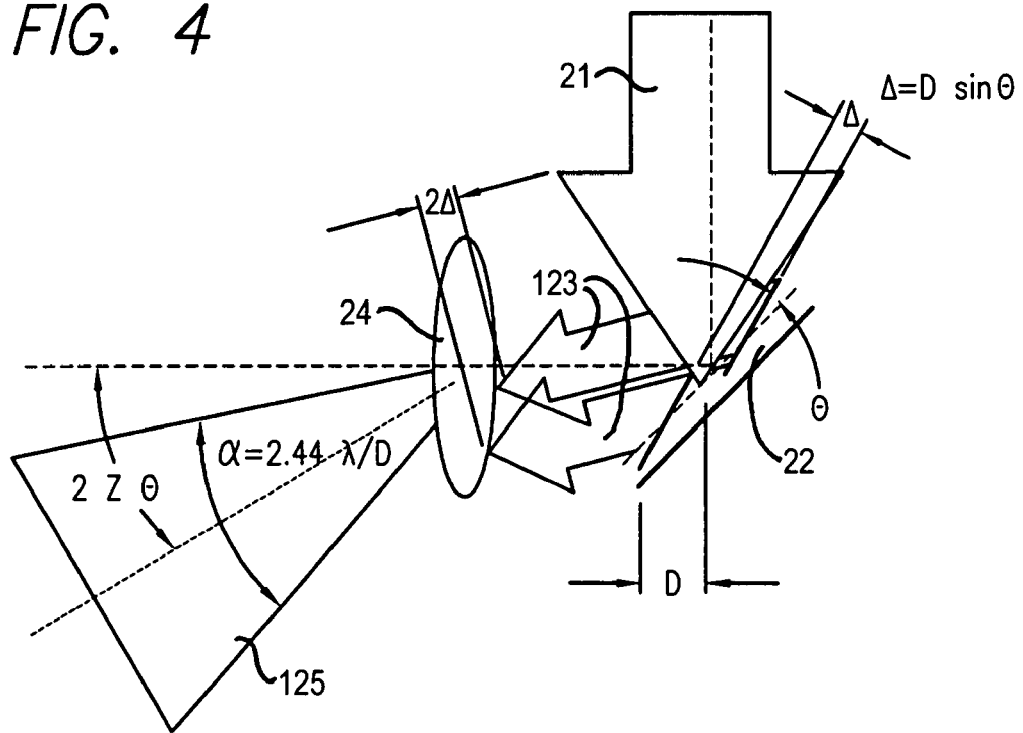
FIG. 4 is a like diagram for the FIG. 3 projection system but with phase error as in FIG. 2.
Figure 8:
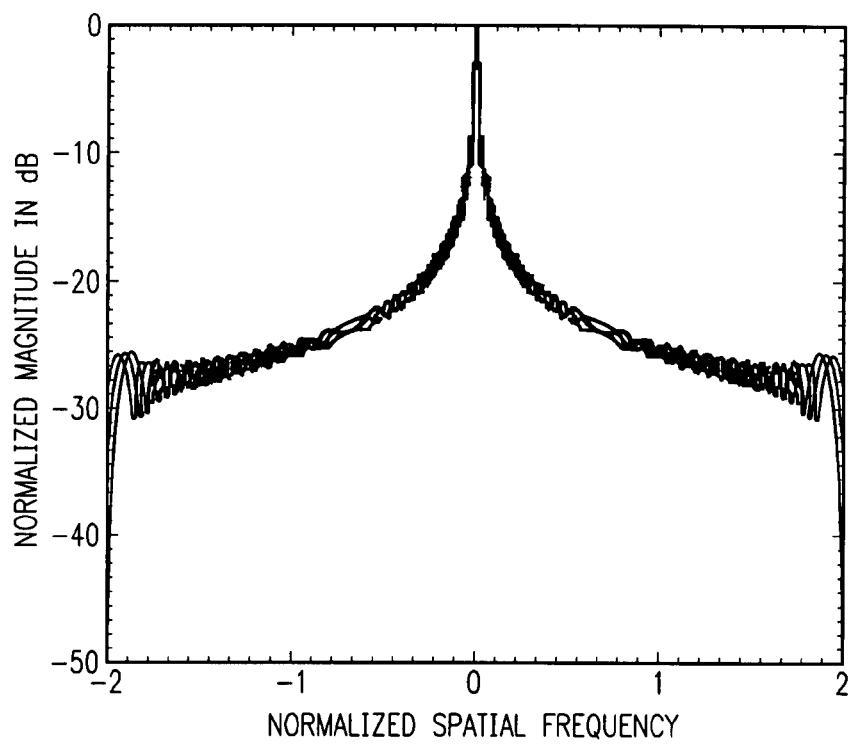
Figure 9:
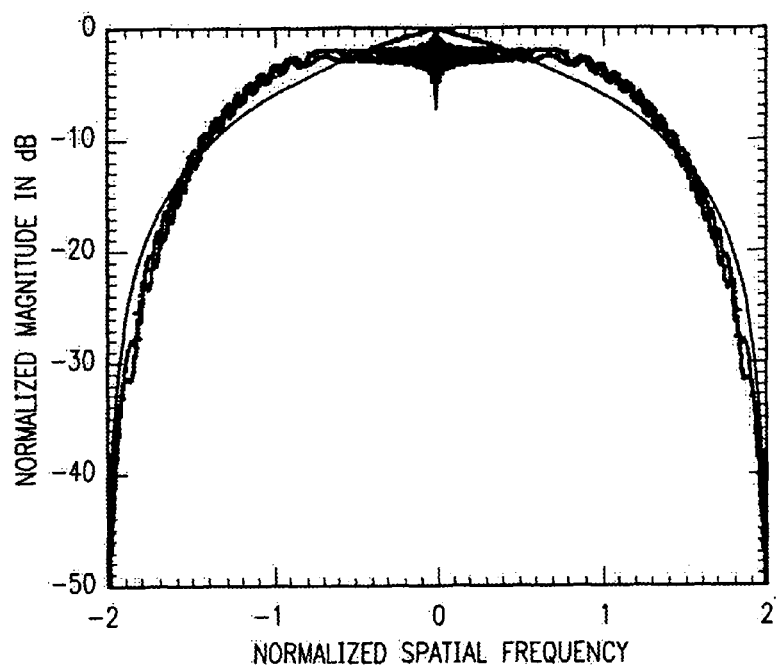
Figure 10:
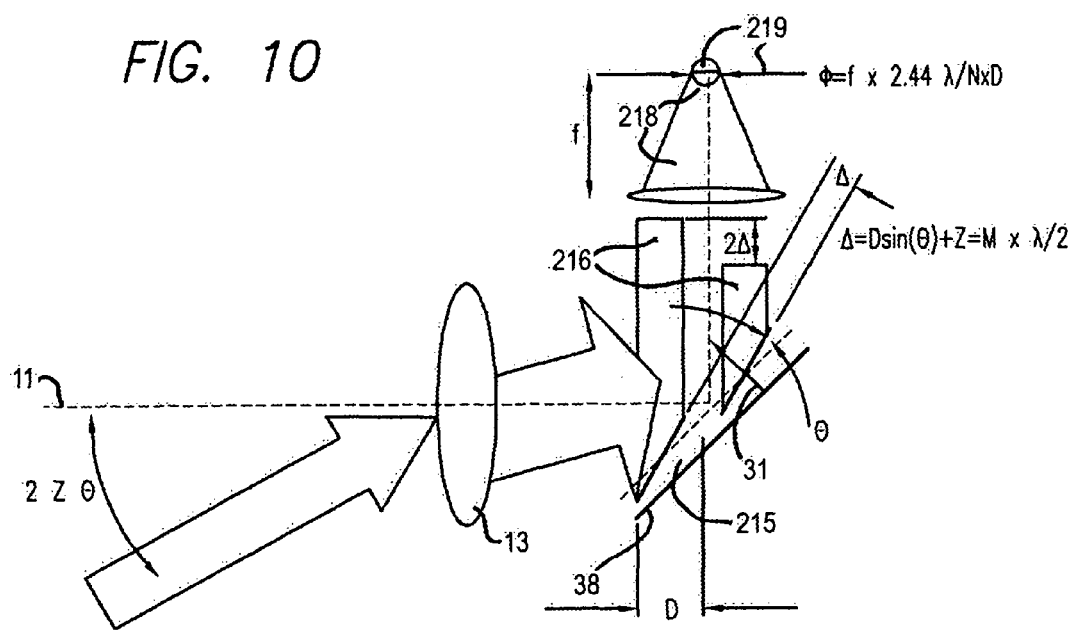
Figure 11:
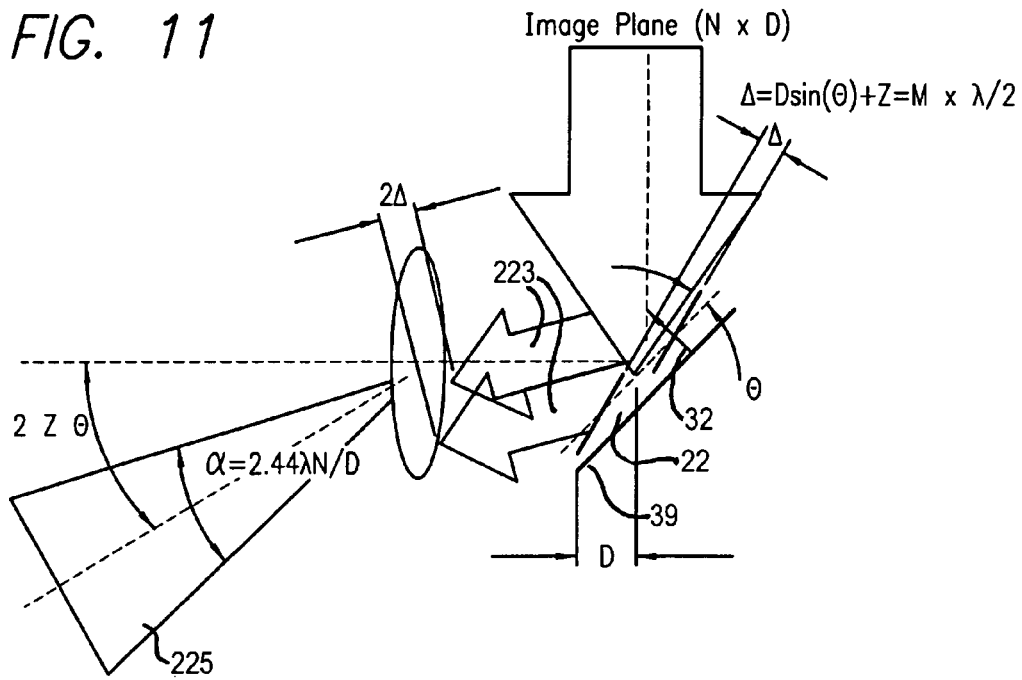
Figure 12:
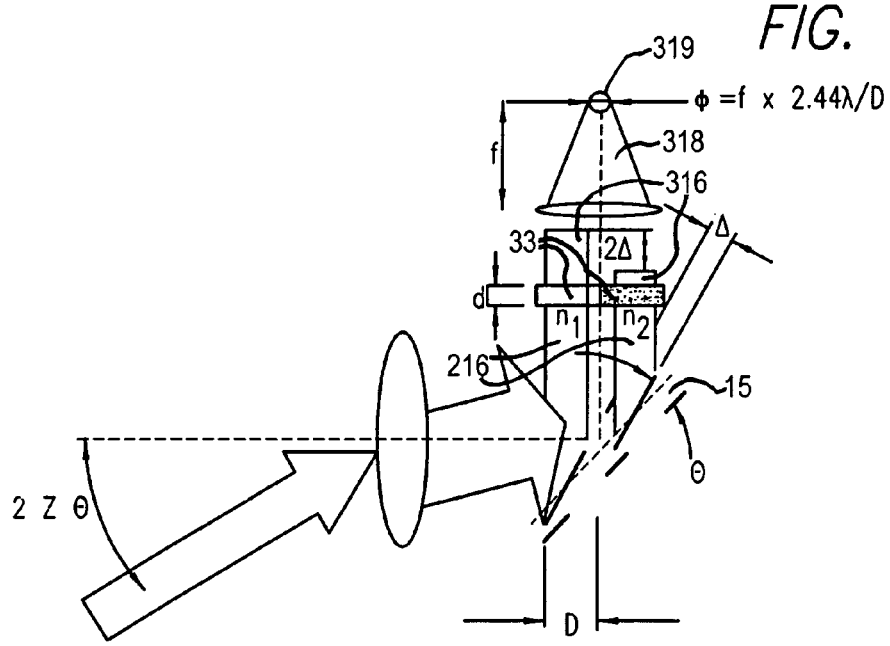
Figure 13:
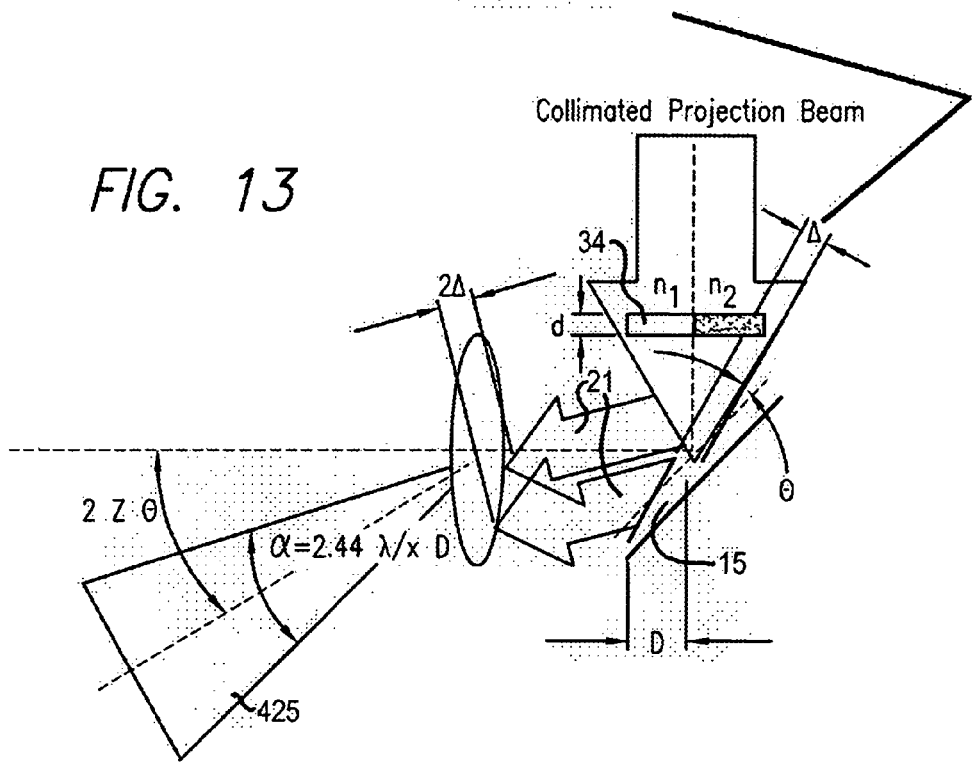
Figure 14:
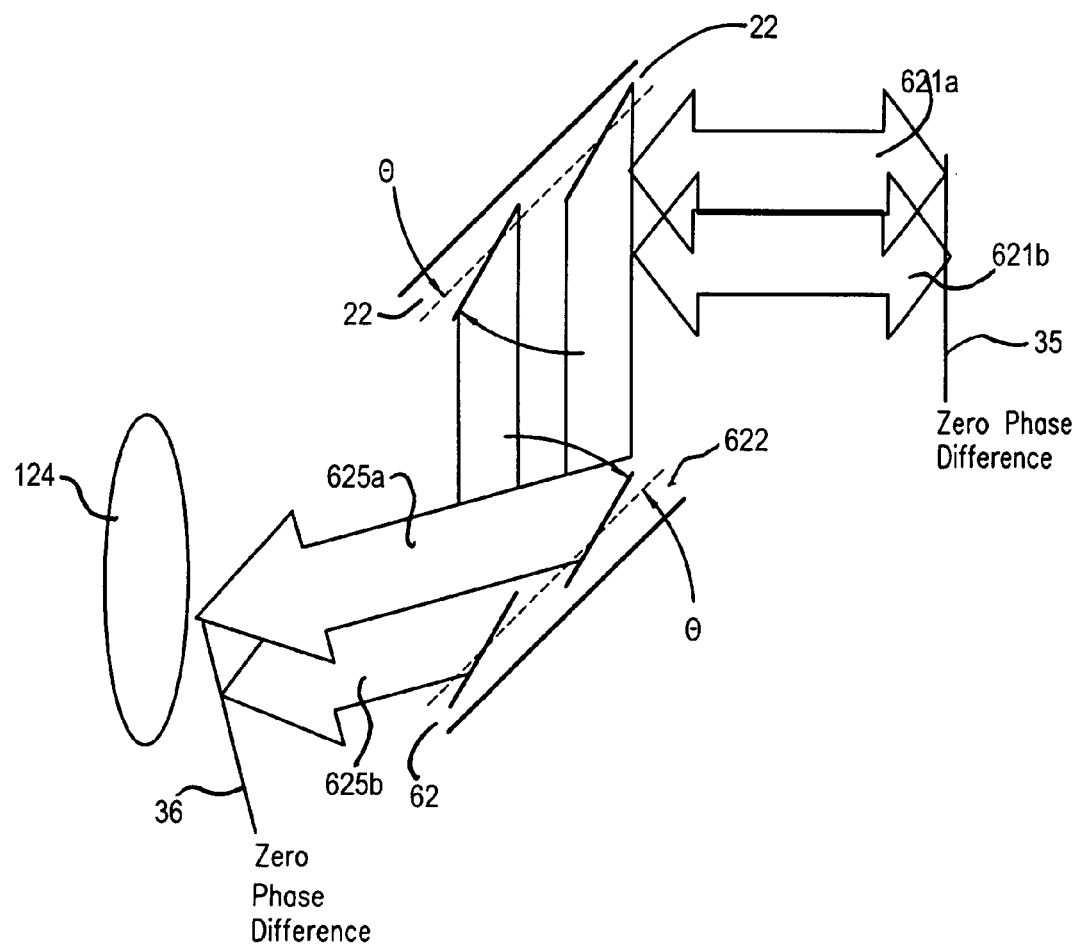

$$\psi = \frac{\pi L^2}{4\lambda}\left(\frac{1}{f} - \frac{1}{d_0} - \frac{1}{d_i}\right)$$

with L=one-dimensional length of the aperture, $d_0$=distance between object and first principal plane of lens, and $d_i$=distance between second principal plane and image plane;

FIG. 8 is a like OTF graph for an optical system with cubic phase mask $$P(x) = \frac{e^{90ix^3}}{\sqrt{2}},$$

with $|x| \leq 1$ for misfocus parameter $\psi=0$, $\pi^2/2$, $\pi^2$;

FIG. 9 is a like graph for an in-focus standard optical system, compared to an optical system with cubic phase mask after filtering with a single filter $$F(u) = \sqrt{\frac{1080|u|}{\pi}}\, e^{-22.5iu^3}$$

for misfocus parameter $\psi=0$, $\pi^2/2$, $\pi^2$;

FIG. 10 is an imaging/sensor-system diagram like FIG. 2 but for a system with wavefront control achieved through MEMS-mirror piston modulation as a function of mirror angle;

FIG. 11 is a like diagram but for an analogous projection system as in FIG. 4;

FIG. 12 is an imaging/sensor-system diagram like FIGS. 2 and 10 but provided with a nonlinear optic, e. g. an addressable in-path refractive index/thickness wavefront correction;

FIG. 13 is a like diagram but for a projection system as in FIGS. 4 and 11; and FIG. 14 is a diagram generally like FIGS. 2, 4, and 10 through 13, but for a tandem dual-array assembly of MEMS mirrors that performs phase-error autocancellation—good for both imaging and projection.

DETAILED DESCRIPTION OF PREFERRED EMBODIMENTS

As explained above, an afocal MEMS-array beam steering device is subject to an apparent diffraction limit. The limit is defined by the size of the individual mirror elements in the MEMS array. The limit can be overcome by proper application of hardware design or a combination of hardware and signal-processing software.

1. Deconvolution of Intensity in the Image Plane—Wavefront Phase Reconstruction

A first way to remove the diffraction limit puts a nonlinear phase modification element (NPME)—e. g. cubic phase plate—in the optical path. The radiance pattern then seen (without the NPME it would be an image) is due to mixing of diffraction-limited reflection from each mirror with the NPME.

A correct choice of NPME enables a mixing that can be unmixed while simultaneously aligning the phase outputs from the individual mirrors. The resulting process provides an image that is diffraction limited at the scale of the entire mirror array, not at the scale of individual mirrors.

One technique for overcoming this diffraction limit is to reconstruct the phase using postprocessing techniques. People of ordinary skill in this field will appreciate that postprocessing can circumvent the diffraction limit for incoming beams only—i. e. for imaging or sensing, not projection.

Figure 5:
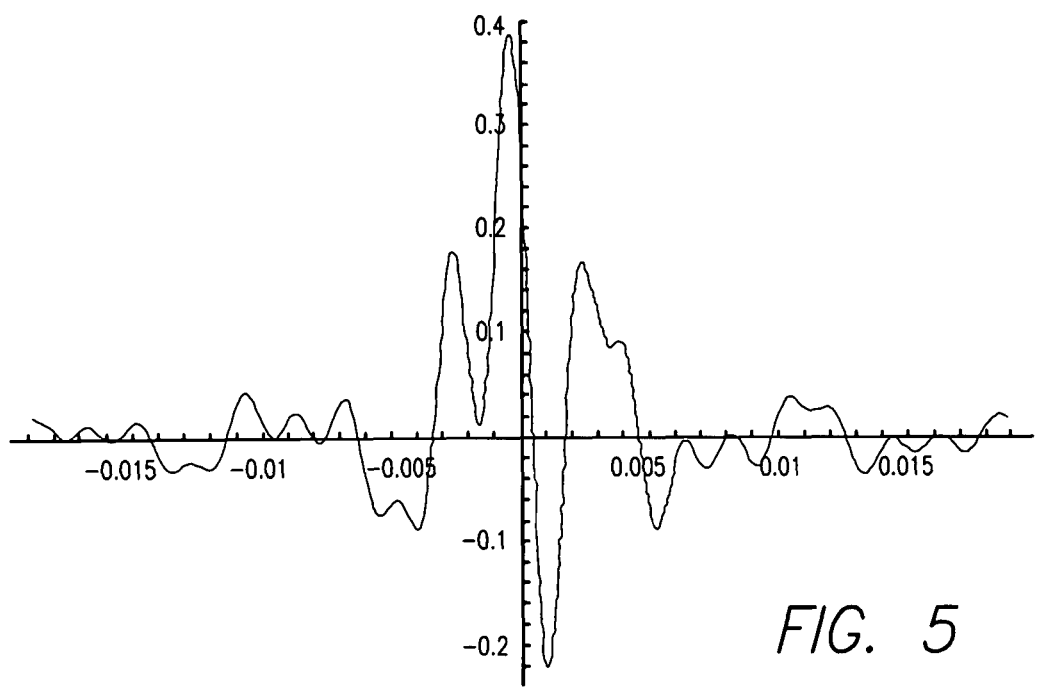
FIG. 5 is a one-dimensional slice of a theoretical single-wavelength diffraction pattern from four rectangular mirrors with random relative phase.
Figure 6:
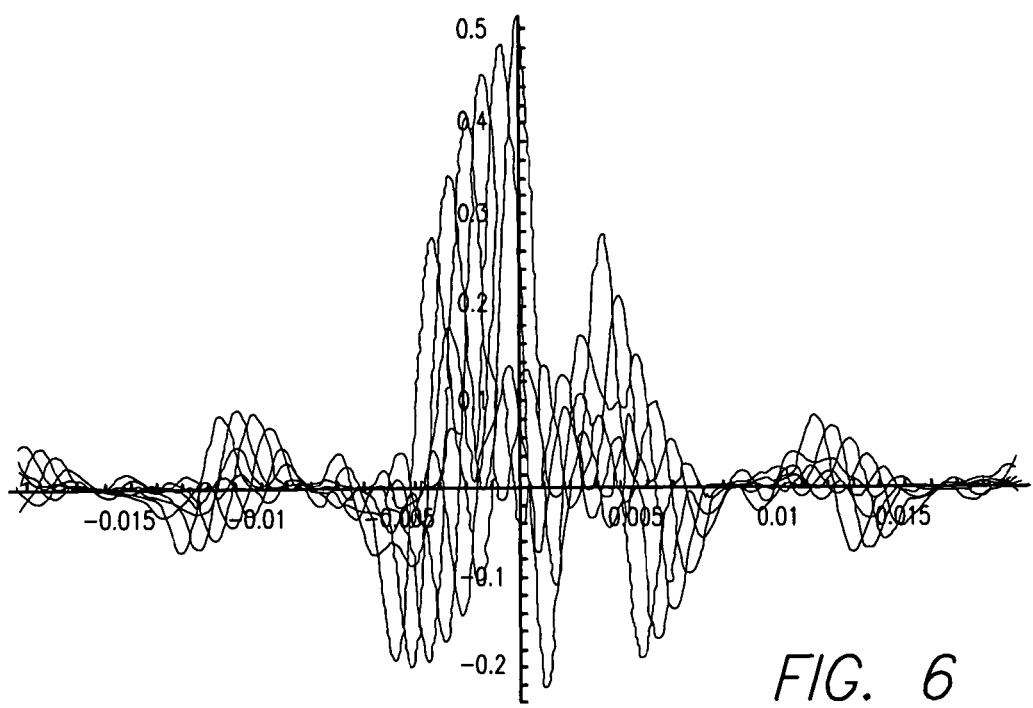
FIG. 6 is a like slice of the single-wavelength diffraction pattern from four rectangular mirrors, but out of phase by 2δ, 4δ and 6δ, respectively, shown for the range δ/π={0, 0.2, 0.4, 0.6, 0.8 and 1}—together with four mirrors with random relative phase.

Examination of a linear array of mirrors with displacements in the normal direction reveals more than one feature that can be exploited in a control loop or in a postprocessing step. With an array of four mirrors, for instance, every eighth zero in the diffraction pattern (FIGS. 5 and 6) is independent of the path differences resulting from the mirror offset positions.

A more-rigorous examination of MEMS-element orientation effects enables compensation of phase errors by means of filtering or wavefront coding. Wavefront coding is a relatively new optical technique, in which a specially-designed phase mask is added to a standard optical system to compensate for misfocus. E. R. Dowski and W. T. Cathey have described the general procedure in "Extended Depth of Field through Wavefront Coding," 34 Applied Optics 11, at 1859-66 (April 1995).

Figure 7:
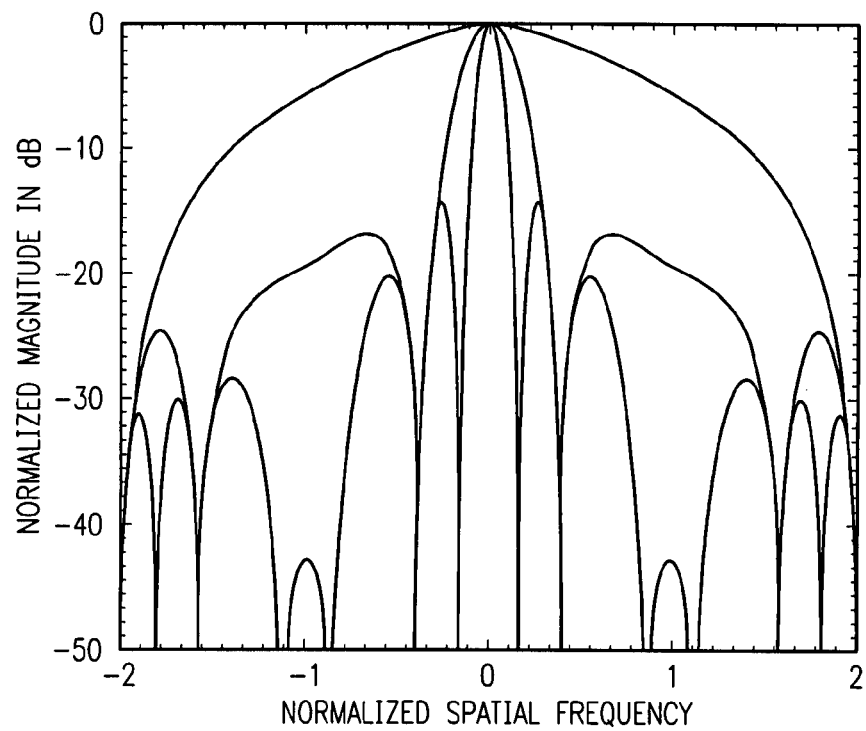
FIG. 7 is a graph showing normalized magnitude of an optical transfer function (OTF), as a function of normalized spatial frequency for a standard optical system having misfocus:parameter $\psi=0$, $\pi^2/2$, $\pi^2$, where misfocus parameter is defined by—

All images are "blurred" by the phase mask, regardless of whether the original optical system is in focus or not; therefore the resulting image requires postprocessing. Because it is possible to form phase masks that make the overall OTF, $$H(u, \psi) = \int P\left(x + \frac{u}{2}\right)e^{i(x+\frac{u}{2})\psi} P*\left(x - \frac{u}{2}\right)e^{-i(x-\frac{u}{2})\psi} dx,$$

insensitive to misfocus in the original optical system, a single filter can be used to obtain clear images for a large range of misfocus (FIGS. 7 through 9).

Thus some exploitable features of MEMS mirror arrays may manifest themselves more as lengthened depth of field than as spot size per se. Simulation and experiments show an improvement of at least a factor of ten in depth of field.

A person skilled in this field can realize this improvement by using mathematical analysis and software simulations to design an optimal nonlinear phase-modification element and corresponding filter. Effects of diffraction due to the array of mirrors can be analyzed using the Fraunhofer theory.

The resulting mathematical description allows a nonlinear optical phase modification element to be designed using standard optimization techniques. (To facilitate that design, a skilled person in this field will be well advised to first prepare custom software for modeling the wavefront-coding properties of arbitrary phase masks.) This optical element will correct for the above-described phase mismatches of the MEMS array, and typically can also increase the depth of field.

There is a known, patented technique using phase plates to correct for phase error in so-called "confocal microscopy"; some details appear in one or more of U.S. Pat. Nos. 5,227,890, 5,748,371, 6,069,738, 6,525,302 and 6,642,504 of the previously mentioned authors Cathey and/or Dowski. A Fresnel lens or refractive-based hologram can be applied in this way; in some environments, however, the ideal NPME may introduce no phase change at all.

In particular, based on knowledge of phase error due to mirror rotation, the same deconvolution of the point-spread function can occur with no physical optical device. The element and filter together remove phase mismatch at the MEMS array while increasing the depth of field.

Within the above-mentioned limitation to incoming beams, i. e. for sensing or imaging, this first form of the invention may represent the best mode of practice. The reason is that at least some variants of this form of the invention are almost exclusively computational, requiring relatively little or nothing in the way of hardware.

Postprocessing for this form of the invention is not limited to fixing one wavelength or extremely narrow waveband at a time. Rather, this system is capable of deconvolving wavelength intervals amounting to more than ±10% of the nominal wavelength—or 0.5 to 1 μm, and this is better than at least some of the optomechanical approaches discussed below.

For imaging and sensing, a primary limitation of this form of the invention appears to be somewhat constrained bandwidth. That limitation is imposed by the desirability of performing the post-processing in real time.

2. Control of Wavefront Phase through Active Control of MEMS Piston as a Function of Scan Angle This form of the invention controls the wavefront by maintaining an integral number of M wavelengths between rays from immediately adjacent mirrors, as the mirrors 215, 22 (FIGS. 10 and 11) are rotated in θ to address different field locations. This is accomplished simply by driving each mirror in z, the so-called "piston" direction 31, 32 (FIGS. 10 and 11), normal to the plane of pivots of the array or backing plane 38, 39. (The dimension z is to be distinguished from the magnification Z of the afocal lens 13, 124.)

In uncorrected configurations (FIGS. 2 and 4) the phase difference is $2\Delta$, where $\Delta = D \sin \theta$. Here an extra displacement z forces the phase difference to $\Delta = D \sin \theta + Z = M \lambda/2$ instead, where M is an integral number (i. e. not a fraction).

Given this imposed phase difference between the parallel-propagating beams 216, 223 (FIGS. 10 and 11), the reimaged beam 218 at the image plane has a spot size 219 that is only 1/N times the size 119 (FIG. 2).

The microprocessor which drives the mirrors is programmed to satisfy the integral-wavelengths condition at all scan angles θ. Unlike the postprocessing technique introduced above, this method serves well for not only a sensor system (FIG. 10) but also a projection system (FIG. 11).

The result is that the diffraction-limited focal spot size φ for a reimaged sensor beam 218 at the image plane 219, or beam divergence angle α for a projected beam 225, is determined once again by the MEMS array size ND and not the individual mirror size D. In effect this form of the invention can be implemented by a programmer.

Of the four forms of the invention presented, this piston-compensation aspect is particularly straightforward, and therefore may represent the best mode of practice—especially for projection systems, in which the deconvolution method and other mainly computational postprocessing approaches appear to be unworkable. Even for imaging or sensing, i. e. for incoming beams, the piston facet of the invention is particularly appealing—not only for its simplicity and ease of implementation, but also for the property that it is fully broadband.

3. Wavefront Correction by Addressable In-Path Adjustment of a Phase-Delay Element This form of the invention too controls the wavefront to maintain an integral number of M wavelengths between path-lengths at adjacent mirrors. Here this phase relationship is produced by insertion of controllably variable delays, in the form of respective nonlinear optical elements 33, 34 (FIGS. 12 and 13), into the optical path.

More specifically such elements of respective index $n_1$, $n_2$, and thickness $d_1$, $d_2$ are inserted into respective subbeams 216 (FIG. 12) emerging from—or beam portions 21 (FIG. 13) approaching—adjacent individual mirrors of the array 15.

If refractive, such an optic either may vary the refractive index n for a constant thickness d of transmissive material, or may vary the thickness d for a material of constant index n—or both. Analogously a nonrefractive element is equally appropriate. A Bragg cell can be used.

This is done for each collimated subbeam reflected from or approaching the MEMS array. The amount of delay is automatically varied as the mirrors rotate in θ to address different field locations.

Here too the system is programmed for automatic servo-control, using known materials of variable index or thickness—or other delay-inducing physical characteristic—and varying at least one of those parameters in a suitable dependence on the scan angle θ. The result once again is that the diffraction-limited performance φ for a sensor (FIG. 12) or α for a projection system (FIG. 13) is determined by the overall MEMS array size ND, not by the individual mirror size D.

Phase-equalized subbeams 316 produce, in the sensor case, a reimaged sensing beam 318 with fine spot 319 (FIG. 12)—and in the projector case, an external projected beam 425 with fine divergence (FIG. 13). In each case the overall phase difference is forced to:

$$2\Delta = 2D \sin \theta + d(n_1 - n_2) + Z = M \lambda$$

(by varying n for each individual mirror independently, as a function of θ), or to $$2\Delta = 2D \sin \theta + n(d_1 - d_2) + Z = M \lambda$$

(by varying d for each individual mirror independently, as a function of θ), or combinations of these effects if preferred.

4. Tandem MEMS Mirror Array Correction—Based on Auto-compensating MEMS Scan Angle Another layout for controlling the relative phase of collimated light reflecting from the MEMS scan mirror array in an afocal configuration is a tandem dual system with two opposing arrays 22, 622 (FIG. 14). In this configuration, as the upper MEMS array rotates through a scan angle θ to address different field locations, the lower array rotates by the same amount and in a compensating sense.

Naturally this geometry operates equivalently for light passage in either direction through the dual array. For definiteness, consider the case of light propagation from an input plane 35 to an output plane 36 at an afocal lens 124:

Incident collimated beams 621a, 621b pass through the overall tandem array 22, 622 reflecting from adjacent mirrors of the two MEMS arrays—in series. The reflected beams arrive at the afocal lens 124 as collimated beams 625a, 625b.

Due to the mutually compensating counterrotation of the two arrays 22, 622, the net optical path difference (OPD) between these two collimated beams 625a, 625b at the output plane 36 is nominally zero. This is true for either an AMBS projection or sensor configuration.

Figure 1:
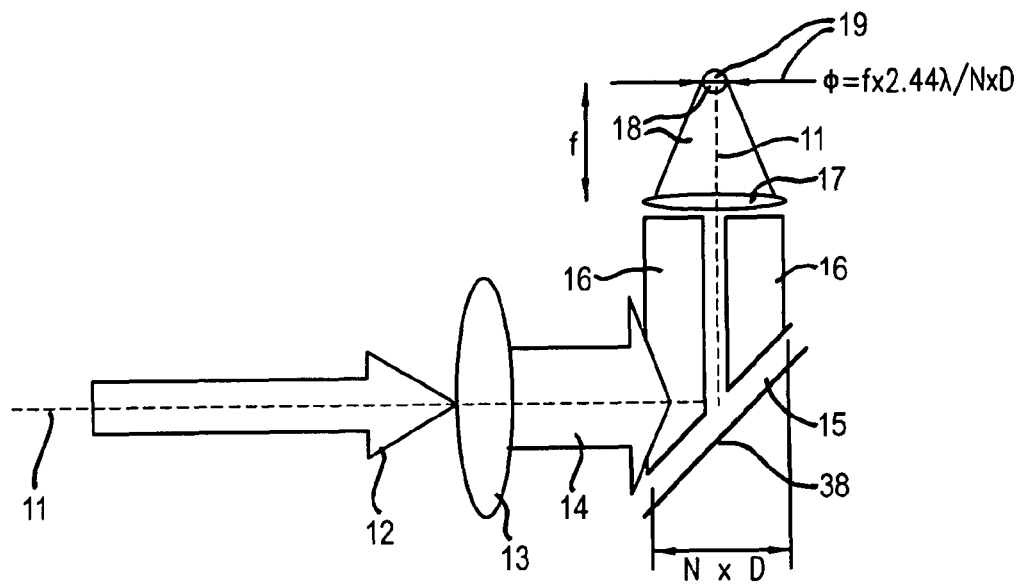
FIG. 1 is a conceptual optical diagram of an afocal MEMS beam-steering system (AMBS) with a MEMS mirror array in a planar orientation, used in an imaging or sensing mode.
Figure 3:
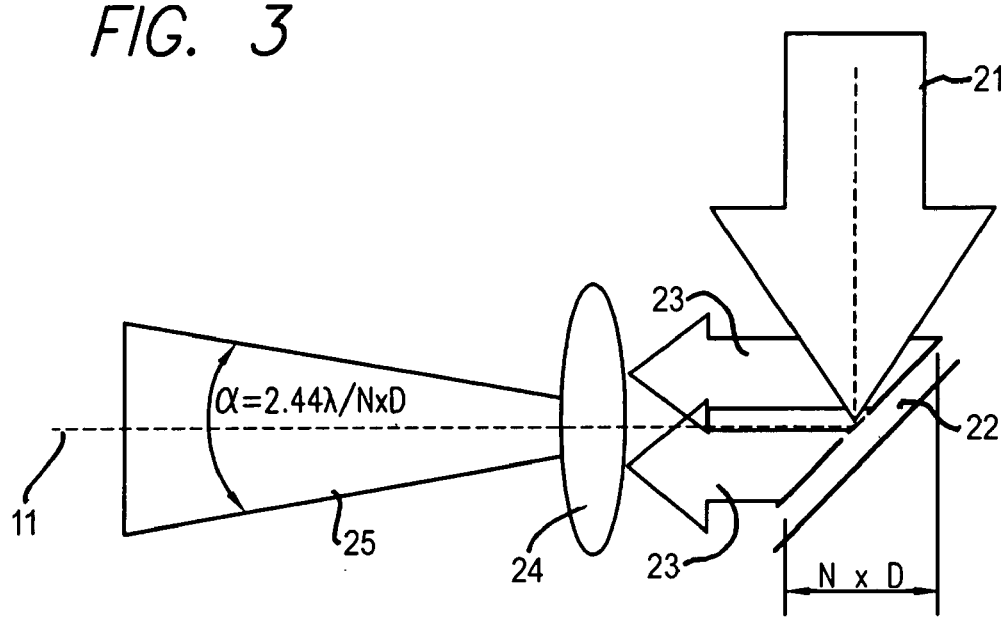
FIG. 3 is a diagram of an AMBS system in planar orientation, analogous to the FIG. 1 system, but used in a projection application rather than imaging or sensing.

The result is that diffraction-limited performance (focal blur size φ for a sensor, and divergence α for a projection system) is determined by the MEMS array size ND and not the individual mirror size D. Diffraction-limited performance for nonzero scan angles θ is thus restored to equal the performance of the favorable zero-angle configurations (FIGS. 1 and 3) discussed earlier.

For the configuration shown, a "compensating sense" of rotation is actually the same absolute sense. That is, when the mirrors in the upper array 22 rotate clockwise, those in the lower array 622 also rotate clockwise.

In this form of the invention, the limits of operation can be critical: as rotation rises to encompass relatively larger angles, a ray initially reflected from e. g. the upper array to the lower array may fall off the specific lower-array mirror which that ray struck initially. In particular, rays from a specific upper-array mirror can be divided, and divided differently, between plural or multiple lower-array mirrors as the rotation angle changes. Careful programming must take into account all these simple geometrical effects, to produce a functional device.

Some additional, new information can now be supplied, for only this final phase-equalizing strategy (FIG. 14). Performance may be less than satisfactory if the mirrors in either array are not initially "flat"—i. e., accurately planar as a group.

Such offset between adjacent mirrors can arise during manufacture of the array, or thereafter due to thermal or other influences. This kind of imperfection can be corrected by piston-dimension (z, FIGS. 10 and 11) movement of the individual mirrors that are involved. The piston movement is simply added in to the basic rotational movements of those mirrors.

The foregoing disclosure is exemplary, and should not be taken to limit the scope of the invention—which is to be determined by the appended claims.

We claim:

1. A method for sharpening a received or projected beam of substantially coherent radiation that is directionally guided by an array of microelectromechanical mirrors, said method comprising the steps of:
   interposing a function that tends to counteract phase differences between rays reflected from adjacent mirrors of the array; and
   causing the interposed function to vary with angles of the mirrors of the array, wherein:
   the interposed function comprises an optical phase shift that is convolved with phase differences between the adjacent mirrors;
   the interposing step comprises having a physical non-linear phase-shift device in a path of said rays; and
   the interposing and causing steps deconvolve the phase shift and phase differences.

2. A method for sharpening a received or projected beam of substantially coherent radiation that is directionally guided by a first array of microelectromechanical mirrors, said method comprising the steps of:
   interposing a function that tends to counteract phase difference between rays reflected from adjacent mirrors of the array; and
   causing the interposed function to vary with angles of the mirrors of the first array, wherein:
   the interposing and causing steps comprise having a second array of microelectromechanical mirrors disposed in optical series with the first array, and controlled to introduce an opposite and compensating phase difference as a function of said angles.

3. Apparatus for receiving a beam of substantially coherent radiation that is directionally guided by an array of microelectromechanical mirrors, said apparatus comprising:
   in a path of said radiation, a physical nonlinear phase-shift device that introduces a first phase shift and optically convolves said first phase shift with other phase shifts introduced by the mirror array; and
   means for deconvolving the first phase shift and said other phase shifts, to extract a substantially unshifted signal.

4. Apparatus for receiving or projecting a beam of substantially coherent radiation that is directionally guided by a first array of microelectromechanical mirrors that introduces a phase difference between rays reflected from adjacent mirrors of the array, said apparatus comprising:
   in a path of said rays, a second array of microelectromechanical mirrors disposed in optical series with the first array;
   means for controlling angles of the mirrors of the second array, as a function of angles of the mirrors in the first array, to introduce a phase difference that is opposite to and compensates for the phase difference introduced by the first array.

5. The apparatus of claim 4, further comprising:
   means for controlling piston displacement of either or both arrays to compensate for nonplanarity of either or both arrays.

* * * * *